United States Patent Office 3,502,640
Patented Mar. 24, 1970

3,502,640
CATALYTIC PROCESS FOR THE POLYMERIZATION OF OLEFINS
Yasusuke Shuto, Mitsuru Uchiyama, Hirozo Sugawara, Yasuhiro Takeshita, Shiro Higashimori, Mitsuhiro Ogawa, and Toshihide Nishimura, Tokuyama-shi, Japan, assignors to Idemitsu Kosan Co., Ltd., Tokyo, Japan
No Drawing. Filed Oct. 4, 1967, Ser. No. 672,696
Claims priority, application Japan, Oct. 17, 1966, 41/67,862; Feb. 14, 1967, 42/8,929; Mar. 31, 1967, 42/19,883
Int. Cl. C08f *1/42, 3/06, 3/10*
U.S. Cl. 260—94.9                  3 Claims

---

ABSTRACT OF THE DISCLOSURE

Polyolefins are prepared by polymerizing an olefin in the presence of a catalyst. The catalyst is a mixture of a halide of Ti, Va, or Zr and an organo-titanium compound. The organo-titanium compound has the formula

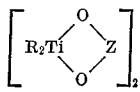

wherein R is an alkyl group and Z is $(CH_2)_m$; $m$ being 2, 3 or 4.

---

This invention relates to a process for producing polyolefins by polymerizing olefins in the presence of a catalyst prepared from a metal halide and a novel organo titanium compound. Further, the invention pertains to a process for producing polyolefins in which the above-mentioned catalyst is incorporated with a dialkylzinc and an amine to form a new catalyst system convenient for the production of polypropylene and in which any of the above-mentioned catalysts is used in the presence of hydrogen to modify the molecular weight of the resulting polyolefins.

As a process for polymerizing olefins using a polymerization catalyst containing a titanium compound as one component, there is already known a process in which there is used a catalyst obtained from titanium tetrachloride or titanium trichloride and an organo aluminum compound.

As a result of various studies, the present inventors have discovered a novel polymerization process in which olefins are highly polymerized with favorable efficiency without using any organo aluminum compound.

The organo titanium compound, which is one component of the catalyst employed in the present invention, is a titanium compound having an alkyl group in the molecule. Even when an organo titanium compound having such an alkyl group in the molecule is used independently, it is possible to polymerize ethylene. In this case, however, not only high temperature, high pressure and a long period of time are required, but also the catalyst should be used in a large amount, and therefore the polymerization efficiency is markedly poor. In the case of propylene and the like olefins, substantially no polymers can be obtained by the independent use of such organo titanium compound.

The inventors have found that a catalyst system prepared by adding a metal halide to said organo titanium compound shows a high polymerization activity, under extremely mild polymerization conditions, towards olefins such as ethylene, propylene, 1-butene, 1-pentene, styrene, butadiene, isoprene, chloroprene and the like, and that it can polymerize ethylene to polyethylene which is high in bulk density (0.25–0.35 g./cc.) and propylene and the like olefins to polymers with a high degree of stereospecificity.

As the metal halide, which forms one component of the above-mentioned catalyst, any of the halides of titanium, vanadium and zirconium is usable. These metal halides include, for example, titanium trichloride, titanium tetrachloride, vanadium tetrachloride, vanadium trichloride, vanodiaum dichloride, vanadium oxychloride, zirconium tetrachloride and bromides and iodides of said metals. Particularly in the case of titanium trichloride, there may be used the so-called A or H type which are respectively prepared by reducing titanium tetrachloride with aluminum or hydrogen.

The organo titanium compound, which is the other component of the catalyst, is a compound represented by the general formula

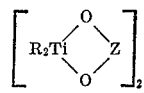

When subjected to molecular weight measurement in benzene according to the freezing point depression method, the above compound shows such a dimer structure but may customarily be represented by a monomer, in some cases.

In the above general formula, R is an alkyl group; and Z is $(CH_2)_n$, in which the hydrogen atoms may have optionally been substituted by alkyl groups, and $m$ is 2, 3 or 4. As said R, a methyl group is preferable because it is stable and is easy to handle. As said Z, any of $(CH_2)_2$, $(CH_2)_3$, $(CH_2)_4$, $CH(CH_3)CH_2CH_2$,
$C(CH_3)_2CH_2CH(CH_3)$ and $CH(C_3H_7)CH(C_2H_5)CH_2$ is preferable from the viewpoints of preparation and handling. Considering the above, the organo titanium compounds particularly effective are

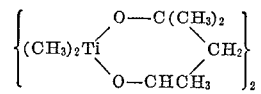

(hereinafter referred to as "PDTDM") and

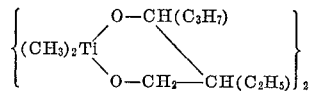

(hereinafter referred to as "HDTDM"). These organo titanium compounds can be obtained by reacting at −70° C. to 20° C., in the presence of an organic solvent such as ether or tetrahydrofuran, a titanium dihalide of the formula

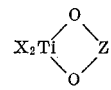

wherein X is a halogen atom; and Z is as defined above, either with a Grignard reagent of the formula $RM_gX$, wherein X is a halogen atom, or with an alkylmagnesium of the formula $R_2Mg$, removing the solvent under reduced pressure and then extracting and purifying the residue with a hydrocarbon solvent such as pentane or heptane. The abovementioned titanium dihalide of the formula

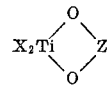

can be prepared either by the reaction of a titanium tetrahalide with a diol of the formula HO—Z—OH, wherein Z is as defined above, or by the reaction of a titanium tetrahalide with a titanium compound of the formula

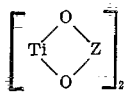

wherein Z is as defined above.

A catalyst showing a particularly high activity in the polymerization of ethylene is the mixture of titanium tetrachloride, titanium trichloride, vanadium tetrachloride, vanadium trichloride or vanadium oxychloride vanadium trichloride or vanadium oxychloride with PDTDM or HDTDM.

A particularly excellent catalyst for the polymerization of propylene is the mixture of titanium trichloride with PDTDM or HDTDM.

Polymerizable olefins include hexene and vinylcyclohexane and the like in addition to those mentioned above. In the present invention, not only can said olefins be homopolymerized, but also 2 or more olefins can be copolymerized. For example, a catalyst comprising vanadium tetrachloride and PDTDM can copolymerize ethylene with propylene to form a rubbery substance.

In the polymerization according to the present invention, an aliphatic hydrocarbon such as hexane, heptane, octane, or cyclohexane, or an aromatic hydrocarbon such as benzene, toluene or xylene, may be used as a polymerization solvent. It is also possible to use a liquid olefin as a polymerization medium without using any of the above hydrocarbons as solvent. In such a case, the polymerization rate particularly increases as compared with the case where said hydrocarbon solvent is used, and therefore the polymerization may be effected either at atmospheric pressure or under pressure. Polymerization temperature is 20° to 100° C., preferably 60° to 80° C.

The metal halides can be used not only independently but also as a mixture of 2 or more. The molar ratio of the metal halide to the organo titanium compound employed in the polymerization is preferably within the range of from 1:0.5 to 1:4.

Specifically, the polymerization in accordance with the present process is carried out in the following manner:

In an atmosphere of an inert gas such as nitrogen or argon, a hydrocarbon solvent, a metal halide and an organo titanium compound are charged into an autoclave or a similar polymerization reactor. The mixture is heated, if necessary, to above room temperature to activate the catalyst. Subsequently, an olefin is added thereto and is polymerized with stirring, and the mixture is maintained at a given polymerization temperature. After the polymerization, the catalyst is removed by a decomposition treatment with an alcohol or alcohol-hydrochloric acid solution, and the resulting polymer is dried. In place of adopting such a batch-wise manner, the polymerization may be effected in a continuous manner, as well.

The polyethylenes prepared according to the present process are high in density, and are industrially useful materials which can be applied, like other polyolefins, to the production of various shaped articles, synthetic fibers and films. However, polyethylene differs in moldability and in uses of products obtained therefrom, depending on the molecular weight thereof, and therefore the availability of polyethylene having various molecular weights is desirable.

The present inventors have now found that when a suitable amount of hydrogen is introduced into the abovementioned polymerization system, the molecular weight of the resulting polyethylene can be optionally modified. That is, in case any of the aforesaid catalyst systems is used independently, the molecular weight of the resulting polyethylene easily exceeds 1,000,000, but when hydrogen is introduced, the molecular weight can be arbitrarily modified to several tens of thousands which value is the most practical.

As to polypropylene, on the other hand, the inventors have found that when a dialkylzinc is further added to the aforesaid catalyst, the catalyst activity (hereinafter referred to as "C.A.") can be rapidly increased. The C.A. is defined herein as the amount (g.) of polypropylene formed per hour per gram of titanium trichloride.

Table 1 below shows examples of propylene polymerization using a liquefied propylene without using solvent. It is seen from the table that as compared with the case of a catalyst system comprising only titanium trichloride and an organo titanium compound, the C.A. of a catalyst system prepared by adding to said catalyst system diethylzinc as a dialkylzinc is more than 10 times the C.A. of said catalyst system, cf. Example 2 in the table. This is of great value, since in commercial production, a large amount of polymer can be obtained by use of a small amount of catalyst.

TABLE 1

| Example | 1 | 2 | 3 | 4 |
|---|---|---|---|---|
| Titanium trichloride (mmol.) | 0.5 | 0.5 | 0.5 | 0.5 |
| Organo titanium compound ² |  |  |  |  |
| PDTDM (mmol.) | 0.5 | 0.5 | 0.5 | 0.5 |
| Diethylzinc (mmol.) | 0 | 0.75 | 0.75 | 0.75 |
| Triethylamine (mmol.) | 0 | 0 | 0.75 | 0.75 |
| Hydrogen (mol.) | 0 | 0 | 0 | 0.007 |
| C.A. | 78 | 860 | 650 | 520 |
| Molecular weight | 120×10⁴ | 71×10⁴ | 55×10⁴ | 16×10⁴ |
| I.I.¹ (percent) | 92 | 56 | 89 | 86 |

¹ Isotacticity index.

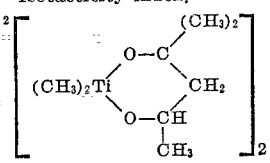

Another favorable advantage of the use of diethylzinc is in that it lowers the molecular weight of polypropylene. Thus, the addition of diethylzinc is markedly effective in increasing catalyst activity and in lowering the molecular weight, but has such a drawback as to bring about a lowering of the I.I. of the polymer. The I.I. is a value showing the content of isotactic structure which, practically, is the most favorable in property as the stereospecific structure portion in polypropylene. It is known that the greater the isotacticity, the more excellent the resin characteristics and the more advantageous the production of polypropylene. The value of I.I. is given as the percentage of hot heptane-insolubles present in the polypropylene.

In order to prevent the polypropylene from undergoing a lowering in I.I., we have investigated various additives and found that amines are effective therefor. That is, when triethylamine is added as the amine, the I.I. of the polymer greatly increases, as seen in Example 3 of Table 1. Other amines also show the same effects as above.

Further, in order for polypropylene to be practically useful, it is required that it be excellent in mechanical characteristics and processability. For this, the polypropylene should have a properly controlled molecular weight. It has been known that the practical molecular weight of polypropylene is from about 130,000 to 230,000. We have made various examinations of molecular weight modifiers and found that the use of hydrogen is effective. Table 1 shows in Example 4 the results attained by the use of hydrogen.

As the aforesaid dialkyzinc, diethylzinc is particularly effective. Further, as the amines, various aliphatic or aromatic amines may be used but, in particular, trethylamine gives favorable results.

When the catalyst components employed are represented by molar ratio, the ratio of titanium trichloride:organo titanium compound:dialkylzinc:amine is preferably within the range of 1:(0.5–3):(0.5–4):(0.1–6). The increase in the amounts of organo titanium compound and dialkylzinc has a tendency to increase the catalyst activity, and the increase in the amount of amine has a tendency to increase the I.I. Further, the increase in the amount of hydrogen is effective in lowering the molecular weight. When hydrogen is used in an amount of 10 to 1500 p.p.m. based on liquefied polypropylene, the molecular weight of the resulting polymer can be effectively modified.

The following examples illustrate the invention.

(I) PRODUCTION OF ORGANO TITANIUM COMPOUNDS

Example I–1

In a 300 ml. three-necked, round-bottomed flask, 2.98 g. (25.2 mmol.) of 2-methylpentane-2,4-diol,

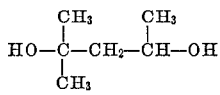

was dissolved in 150 ml. of anhydrous ether.

To the solution, 4.85 g. (25.5 mmol.) of titanium tetrachloride were added dropwise, while vigorously stirring the solution in an argon atmosphere, and the stirring was continued until all of the yellow precipitates became white. Subsequently, 1180 ml. (50.4 mmol.) of dried ammonia gas were injected into the mixture and were combined with by-product hydrogen chloride to complete an equilibrium reaction. Thereafter, the reaction mixture was cooled to $-10°$ C., and 57.4 ml. (63.2 mmol.) of an ether solution of methylmagnesium chloride were added dropwise thereto over a period of 1.5 hours. Immediately after completion of the dropwise addition, the reaction mixture was filtered, and filtrate was concentrated at 0° C. under reduced pressure and was finally dried at 20° C. under 1 mm. Hg for one hour to completely remove the ether. The resulting greyish yellow powder was extracted with 280 ml. of pentane to obtain 278 ml. of a light yellow transparent solution. This solution had a titanium concentration of 0.051 mmol./ml. and the yield thereof was 56% (based on Ti; the same shall apply hereinafter). A part of the solution was recrystallized at $-78°$ C. or was concentrated to dryness, and the resulting light yellow crystals were analyzed to confirm that the product was a dimer of 2-methylpentane-2,4-diol-titanium-dimethyl

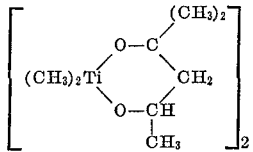

having a titanium content of 24.60% (theoretical value: 24.67%) and a molecular weight (according to freezing point depression method using benzene) of 392 (theoretical value: 388.2).

Example I–2

30.1 g. (128 mmol.) of a white powder of 2-methylpentane-2,4-diol-titanium dichloride

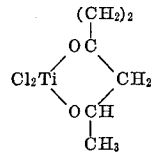

which had been obtained by reacting in benzene or the like solvent bis-(2-methylpentane-2,4-diol)-titanium,

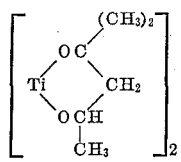

with an equivalent of titanium tetrachloride, was charged in an argon atmosphere into a 2 l. three-necked, round-bottomed flask, and was dissolved in 1 l. of anhydrous tetrahydrofuran. To the solution, 114 ml. (257 mmol.) of an ether solution of methylmagnesium iodide were added dropwise over a period of 2–3 hours, while vigorously stirring the solution at $-10°$ C. After completion of the dropwise addition, the mixture was further stirred at $-10°$ C. for an additional hour, mixed with 500 ml. of cooled pentane and then allowed to stand. Subsequently, the liquid portion was separated and was concentrated to dryness at $-10°$ C. under reduced pressure, and the resulting residue was extracted with 600 ml. of pentane. The extract was cooled overnight at $-78°$ C. to obtain 14.4 g. (74.3 mmol.) of light yellow crystals, yield 58%. The thus obtained product was substantially identical with the product obtained in Example I–1.

Example I–3

6.76 g. (32.6 mmol.) of a white powder of

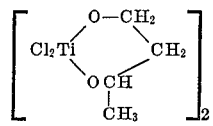

which had been obtained by reacting in benzene or the like

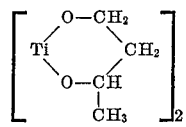

with an equivalent of titanium tetrachloride, was suspended in 500 ml. of anhydrous tetrahydrofuran in an argon atmosphere. To the suspension, 29.2 ml. (65.2 mmol.) of an ether solution of methylmagnesium iodide were added dropwise over a period of one hour, while vigorously stirring the suspension at $-10°$ C. After completion of the dropwise addition, the suspension was further stirred at $-10°$ C. for 3 hours, mixed with 200 ml. of cooled pentane and then allowed to stand. Subsequently, the liquid portion was separated, concentrated to dryness at $-10°$ C. under reduced pressure, and the resulting residue was extracted with 200 ml. of cooled pentane. The extract was cooled overnight at $-78°$ C. to obtain 0.83 g. (5 mmol.) of yellow crystals, yield 15%. The crystals were analyzed to confirm that the product was a dimer of butane-1,3-diol-titanium dimethyl

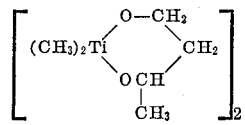

(II) POLYMERIZATION OF OLEFINS BY USING ORGANO TITANIUM COMPOUND-METAL HALIDE CATALYST SYSTEM

Example II–1

A 200 ml. autoclave was thoroughly flushed with argon, and was charged with 10 ml. of a pentane solution containing 0.075 g. of titanium trichloride and 0.194 g. of PDTDM. The autoclave was cooled to below room temperature, and 67 g. of liquefied propylene were added to the pentane solution under pressure. Subsequently, the mixture was heated and polymerized with stirring at 70° C. for one hour. The resulting polymer was treated with methanol and was then dried to obtain 18.7 g. of a white powdery polypropylene. The polymer had a heptane insoluble content of 85% and an intrinsic viscosity [η] of 14.6 (measured in tetraline at 135° C.; the same shall apply hereinafter).

Example II–2

Polymerization was effected in exactly the same manner as in Example II–1, except that 0.097 g. of PDTDM was used, to obtain 5.2 g. of a polypropylene having a hot heptane insoluble content of 87% and an intrinsic viscosity [η] of 15.3.

Example II-3

A 200 ml. of autoclave was thoroughly flushed with argon, and was charged with 95 ml. of a heptane solution containing 0.075 g. of titanium trichloride and 0.194 g. of PDTDM. The autoclave was cooled to below room temperature, and liquefied propylene was added to the heptane solution under pressure. Subsequently, the mixture was heated and polymerized with stirring at 70° C. for one hour while maintaining the pressure at 11 kg./cm.$^2$. The resulting polymer was treated with methanol and was then dried to obtain 6.1 g. of a polypropylene having a hot heptane insoluble content of 89%, and an intrinsic viscosity [$\eta$] of 11.1.

Example II-4

A 1000 ml. autoclave was thoroughly flushed with argon, and was charged with 500 ml. of a heptane solution containing 0.072 g. of titanium tetrachloride and 0.145 g. of PDTDM. Into the heptane solution, ethylene was introduced under pressure, and the mixture was heated and polymerized at 70° C. for 30 minutes while maintaining the pressure at 10 kg./cm.$^2$. The resulting polymer was treated with methanol and was then dried to obtain 125 g. of polyethylene powder.

Example II-5

A 3000 ml. autoclave was flushed with argon, and was charged with 150 ml. of a heptane solution containing 0.28 g. of zirconium tetrachloride and 0.23 g. of PDTDM. Into the solution, ethylene was introduced under pressure, and the mixture was heated and polymerized with stirring at 70° C. for one hour while maintaining the pressure at 10 kg./cm.$^2$. The resulting polymer was treated with methanol and was then dried to obtain 10.3 g. of polyethylene powder.

Example II-6

A 300 ml. autoclave was flushed with argon, and was charged with 150 ml. of a heptane solution containing 0.13 g. of titanium tetrachloride and 0.27 g. of PDTDM. To the heptane solution, 25 g. of butene-1 was added, and the mixture was heated and polymerized with stirring at 70° C. for one hour. The resulting polymer was treated with methanol and was then dried to obtain 17.3 g. of powdered polybutene-1.

Example II-7

A 300 ml. autoclave was flushed with argon, and was charged with 150 ml. of a heptane solution containing 0.19 g. of vanadium tetrachloride and 0.27 g. of PDTDM. Into the autoclave, a mixed gas comprising 25% of ethylene and 75% of propylene was introduced under pressure, and the mixture was polymerized with stirring at 70° C. for one hour. The resulting polymer was treated with methanol and was dried to obtain 13.3 g. of a rubbery polymer.

(III) POLYMERIZATION OF ETHYLENE BY USING ORGANO TITANIUM COMPOUND-METAL HALIDE-HYDROGEN CATALYST SYSTEM

Examples III-1 to 12

A 1000 ml. autoclave was flushed with argon, and was charged with 500 ml. of heptane and the amounts of titanium tetrachloride and PDTDM given in Table 2. Subsequently, the liquid in the autoclave was maintained at 50° C. or 60° C., and ethylene pressurized to 9 kg./cm.$^2$ was absorbed in the liquid with stirring until the ethylene pressure became 8.8 kg./cm.$^2$ After discharging ethylene, a mixed gas comprising ethylene and hydrogen in a definite proportion was charged under pressure into the liquid, and the mixture was polymerized for a definite period of time. After the polymerization, the resulting polymer was treated with methanol and was then dried to obtain powdery polyethylene. The results are shown in Table 2.

TABLE 2

| Example | 1 | 2 | 3 | 4 | 5 | 6 | 7 | 8 | 9 | 10 | 11 | 12 |
|---|---|---|---|---|---|---|---|---|---|---|---|---|
| TiCl$_4$ (mmol.) | 1 | 1 | 1 | 1 | 1 | 1 | 1 | 1.6 | 1.33 | 0.8 | [1] 2 | [2] 2 |
| PDTOM (mmol.) | 2 | 2 | 2 | 2 | 2 | 2 | 2 | 2 | 2 | 2 | 3 | 3 |
| Ethylene pressure (kg./cm.$^2$) | 3 | 3 | 3 | 3 | 3 | 3 | 3 | 2 | 2 | 2 | 2 | 2 |
| Hydrogen pressure (kg./cm.$^2$) | 15 | 3 | 6 | 7.5 | 6 | 6 | 6 | 4 | 4 | 4 | 4 | 4 |
| Polymerization temperature (° C.) | 60 | 60 | 60 | 60 | 50 | 50 | 50 | 50 | 50 | 50 | 60 | 60 |
| Polymerization time (min.) | 210 | 210 | 210 | 210 | 90 | 120 | 210 | 90 | 90 | 90 | 120 | 120 |
| Polyethylene (g.) | 106 | 102 | 94 | 60 | 65 | 83 | 96 | 75 | 93 | 42 | 52 | 33 |
| Molecular weight | 7.7×10$^4$ | 5.8×10$^4$ | 4.0×10$^4$ | 3.4×10$^4$ | 6.5×10$^4$ | 5.5×10$^4$ | 5.0×10$^4$ | 6.1×10$^4$ | 8.6×10$^4$ | 11.3×10$^4$ | 8.7×10$^4$ | 7.6×10$^4$ |

[1] Vanadium tetrachloride. [2] Zirconium tetrachloride.

(IV) POLYMERIZATION OF PROPYLENE BY USING ORGANO TITANIUM COMPOUND-TITANIUM TRICHLORIDE - DIALKYLZINC-AMINE-HYDROGEN CATALYST SYSTEM

Examples IV-1 to 11

A 300 ml. autoclave was thoroughly flushed with argon and was charged with the amounts of titanium trichloride, PDTDM as organo titanium compound, diethylzinc and triethylamine given in Table 3. Into the autoclave, 100 g. of liquefied propylene and then a given amount of hydrogen were introduced under pressure. The mixture was maintained at 70° C. and polymerized with stirring for one hour. The polymerization pressure reached 25-30 kg./cm.$^2$. After cooling the mixture, unpolymerized propylene was discharged. The resulting polypropylene was treated with methanol to decompose the catalyst and was then dried in vacuum, whereby the polymer was brought into a powdery state. The results obtained are shown in Table 3. (Example 4 set forth in Table 1 was also effected according to this example.)

TABLE 3

| Example | 1 | 2 | 3 | 4 | 5 | 6 | 7 | 8 | 9 | 10 | 11 |
|---|---|---|---|---|---|---|---|---|---|---|---|
| Titanium trichloride (mmol.) | 0.5 | 0.5 | 0.5 | 0.5 | 0.5 | 0.75 | 0.75 | 0.75 | 0.75 | 0.75 | 0.75 |
| PDTDM (mmol.) | 0.5 | 0.5 | 0.5 | 0.5 | 0.5 | 0.75 | 0.75 | 0.75 | 0.75 | 1.5 | 1.5 |
| Diethylzinc (mmol.) | 0.75 | 0.75 | 1.0 | 1.0 | 1.0 | 1.5 | 1.5 | 1.5 | 1.5 | 1.5 | 1.5 |
| Triethylamine (mmol.) | 0.75 | 0.75 | 1.0 | 1.0 | 1.5 | 1.5 | 1.5 | 1.5 | 1.5 | 2.25 | 2.25 |
| Hydrogen (mol.) | 0.014 | 0.021 | 0.0022 | 0.0045 | 0.0022 | 0.0022 | 0.0045 | 0.009 | 0.018 | 0.0022 | 0.0045 |
| C.A. | 350 | 285 | 512 | 460 | 490 | 390 | 400 | 358 | 247 | 556 | 436 |
| Molecular weight | 11×10$^4$ | 9×10$^4$ | 16.2×10$^4$ | 13.2×10$^4$ | 19.9×10$^4$ | 20.4×10$^4$ | 14.6×10$^4$ | 11.3×10$^4$ | 7.18×10$^4$ | 25.2×10$^4$ | 17.9×10$^4$ |
| I.I. (percent) | 85 | 82 | 90.1 | 89 | 84.9 | 91.2 | 87.6 | 86.5 | 84.9 | 89.4 | 83.5 |

What is claimed is:

1. A process comprising homopolymerizing or copolymerizing olefins in the presence of a catalyst which is a mixture of a halide of titanium, vanadium or zirconium and an organo titanium compound of the formula

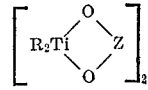

wherein R is an alkyl group; and Z is $(CH_2)_m$, in which one or more hydrogen atoms may be substituted by an alkyl group; and $m$ is 2, 3 or 4.

2. A process for producing polyethylene modified in molecular weight, said process comprising polymerizing ethylene in the presence of hydrogen and a catalyst which is a mixture of a halide of titanium, vanadium or zirconium and an organo titanium compound of the formula:

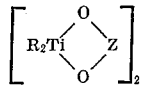

wherein R is an alkyl group; and Z is $(CH_2)_m$, in which one or more hydrogen atoms may be substituted by an alkyl group; and $m$ is 2, 3 or 4.

3. A process for producing polypropylene, said process comprising polymerizing propylene in the presence of hydrogen and a catalyst which is a mixture of titanium trichloride, a dialkylzinc, an amine and an organo titanium compound of the formula of

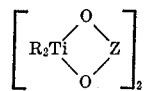

wherein R is an alkyl group; and Z is $(CH_2)_m$, in which one of more hydrogen atoms may be substituted by alkyl groups; and $m$ is 2, 3 or 4.

No references cited.

JOSEPH L. SCHOFER, Primary Examiner

EDWARD J. SMITH, Assistant Examiner

U.S. Cl. X.R.

252—429, 431; 260—88.2, 92.3, 93.5, 93.7, 94.3, 429.5